United States Patent
Mizota et al.

(10) Patent No.: US 7,420,155 B2
(45) Date of Patent: Sep. 2, 2008

(54) OPTICAL TACTILE SENSOR AND METHOD OF RECONSTRUCTING FORCE VECTOR DISTRIBUTION USING THE SENSOR

(75) Inventors: Terukazu Mizota, Yamatokohriyama (JP); Kazuto Kamiyama, Maebashi (JP); Hiroyuki Kajimoto, Yokohama (JP); Naoki Kawakami, Tokyo (JP); Susumu Tachi, Tsukuba (JP)

(73) Assignee: Toudai TLO, Ltd., Tokyo (JP)

( * ) Notice: Subject to any disclaimer, the term of this patent is extended or adjusted under 35 U.S.C. 154(b) by 28 days.

(21) Appl. No.: 10/571,576

(22) PCT Filed: May 21, 2004

(86) PCT No.: PCT/JP2004/007285

§ 371 (c)(1),
(2), (4) Date: Mar. 9, 2006

(87) PCT Pub. No.: WO2005/029028

PCT Pub. Date: Mar. 31, 2005

(65) Prior Publication Data

US 2007/0040107 A1   Feb. 22, 2007

(30) Foreign Application Priority Data

Sep. 16, 2003   (JP) ............................... 2003-322624

(51) Int. Cl.
*G06M 7/00* (2006.01)
*G06F 3/042* (2006.01)
(52) U.S. Cl. ........................... 250/221; 345/175; 901/33
(58) Field of Classification Search ................. 250/221; 345/175, 173; 901/33
See application file for complete search history.

(56) References Cited

U.S. PATENT DOCUMENTS

| 4,668,861 A | * | 5/1987 | White | .................... 250/227.21 |
| 6,037,703 A | | 3/2000 | Kambe et al. | |
| 6,909,084 B2 | | 6/2005 | Tachi et al. | |
| 7,189,256 B2 | * | 3/2007 | Smith | ........................ 623/1.34 |

FOREIGN PATENT DOCUMENTS

| CA | 2419252 A1 * | 2/2003 |
| JP | 11-108630 A | 4/1999 |
| JP | 11-118625 A | 4/1999 |
| WO | 02/18893 A1 | 3/2002 |

* cited by examiner

OTHER PUBLICATIONS

Shimojo, M., "Development of Tactile sensors using liquid type pressure sensitive material," pp. 7-8,IEEE (2004).

*Primary Examiner*—Georgia Y. Epps
*Assistant Examiner*—Brian J Livedalen
(74) *Attorney, Agent, or Firm*—Ladas & Parry, LLP

(57) ABSTRACT

The invention relates to a tactile sensor capable of obtaining information for a plurality of degrees of freedom at each point on a surface. An optical tactile sensor is provided with a sensing part and a photographing device, the sensing part comprising a transparent elastic body and a plurality of groups of markers provided inside the elastic body, each marker group being made up of a number of colored markers, with markers making up different marker groups having different colors for each group. The elastic body has an arbitrary curved surface. The behavior of the colored markers when an object touches the curved surface of the elastic body is obtained as image information of markers by photographing device. The sensor further comprises a force vector distribution reconstructing device for reconstructing forces applied to said surface from information as to the behavior of markers that is obtained from said image information of markers.

27 Claims, 7 Drawing Sheets

View range

OPTICAL TACTILE SENSOR AND METHOD OF RECONSTRUCTING FORCE VECTOR DISTRIBUTION USING THE SENSOR

FIELD OF THE INVENTION

The present invention relates to an optical tactile sensor, and preferably to a tactile sensor used for a robot hand.

BACKGROUND OF THE INVENTION

When considering understanding the contact state of a contact surface using a tactile sensor, there are vectors of three components representing magnitude and direction of force acting at each point of the contact surface. This is represented as f(x,y) in the coordinate system of FIG. 1. Here, f is a vector, and so actually has three components x, y and z at each point. When explicitly expressing each component, it is represented as f(x,y)=[fx(x,y), fy(x,y), fz(x,y)].

Some of inventors of the present invention et al. have proposed an optical tactile sensor that is capable of measuring three-dimensional force vector distribution. The optical tactile sensor is disclosed in WO02/188923 A1 and incorporated herein by reference. A principle of the optical tactile sensor will be explained based on FIG. 2. The optical tactile sensor comprises a transparent elastic body and a CCD camera. By photographing spherical markers embedded in the transparent elastic body by the CCD camera, internal strain information of the elastic body is measured when a force is applied on the surface of the elastic body, and force vector distribution is reconstructed from the information.

By taking an image of the spherical markers by a CCD camera from z-direction where an elastic body surface is taken as the x-y plane and an orthogonal direction to the x-y plane is taken as the z-axis, movement of a point to be measured when force is applied is measured as a movement vector in the x-y plane. However, it is difficult to reconstruct the force vector distribution from the strain information because an amount of information is insufficient. Therefore, N×N red spherical markers and blue spherical markers are arranged at different depths in the elastic body as points to be measured to obtain two sets of two-dimensional movement vectors with different depths as two pieces of different information, thereby increasing the amount of information to reconstruct the force vector distribution.

According to the above-mentioned optical tactile sensor, the optical tactile sensor having a flat surface is generally employed. Since the surface is photographed as two-dimensional image information, application of flat surface that corresponds to the two-dimensional image information may be a natural choice. Also, in case of a sensor with a flat surface, it is easier to reconstruct force vector distribution.

This type of optical tactile sensor has advantages in that it can measure three-dimensional force vector distribution and has an elastic body providing a flexible surface to be contacted by an object. For example, in a situation where the optical tactile sensor is provided at a robot hand of a humanoid, it is necessary to hold a glass without breaking and dropping. To prevent the glass from dropping, it is necessary to sense a force acting in the direction parallel to the surface of the glass. This is possible with the above-mentioned optical tactile sensor. Here, when considering applications of this type of optical tactile sensor for various purposes, it is necessary to construct a tactile sensor with an arbitrary curved surface not with a flat surface. However, it is difficult to reconstruct force vector distribution with an arbitrary curved surface. In this regard, a tactile sensor with an arbitrary curved surface is disclosed in "Development of arbitrary curved type tactile sensor using pressure conductive rubber", Shiinojo et al., Robotics Society of Japan, 1 G24, 2002. However, it is not possible to acquire force vector distribution by this sensor.

An object of the present invention is to provide an optical tactile sensor with an arbitrary curved surface.

Another object of the present invention is to reconstruct force vector distribution applied to an arbitrary curved surface from marker information.

Still another object of the present invention is to provide an optical tactile sensor that is capable of being used as a tactile sensor for a robot hand or a computer interface.

Still further object of the present invention is to provide a method of obtaining a transfer function by which a force vector distribution is calculated by using marker information.

SUMMARY OF THE INVENTION

The present invention relates to an optical tactile sensor provided with a tactile section and a photographing device. The tactile section comprising a transparent elastic body and a plurality of groups of markers provided inside the elastic body, each marker group being made up of a number of colored markers, with markers making up different marker groups having different colors for each group. The elastic body comprises an arbitrary curved surface (a non-flat surface). The photographing device takes an image of the colored makers in the transparent elastic body to obtain image information of markers when an object touches the surface of elastic body. The sensor further comprises a force vector distribution reconstructing device that reconstructs force vector distribution from information as to the behavior of the markers (movement vectors of the markers, for example). The information as to the behavior of markers can be obtained from the image information of markers.

At least one of displacement, strain and inclination of the colored markers when the elastic body contacts an object is observed by photographing behavior of the colored markers. Strain information inside the transparent elastic body is detected from information about the behavior colored markers when a contact object touches the sensor, and the shape of the contact object calculated from strain information, and information about force acting on a contact interface (including both the elastic body surface and the contact object surface) are also detected. According to the present invention, it is possible to separately collect a plurality of types of information with a simple method called "color coding", and it is possible to acquire a plurality of types of tactile information at the same time with an optical system. According to the present invention, independent observed information whose number is equal to or greater than the number of unknowns are collected using color coding, and it is possible to estimate and reconstruct force vectors by stably resolving a inverse problem.

The colored markers are photographed by photographing device, in a preferred example, a CCD camera, and image processing is carried out by a processor. For example, an image at the time of body contact and an image of a previous condition (a condition where external force is not acting on the transparent elastic body) are compared, and an amount of movement of the markers is detected. Alternatively, the markers are embedded in the transparent elastic body in such an arrangement that they can not be recognized normally (in a state where external force is not acting on the transparent elastic body), and a configuration is such that markers are recognized in response to displacement deformation and inclination of markers caused by strain in the vicinity of positions where each of the markers exist when an object contacts the transparent elastic body, and information is detected from the appearance of the colored markers. In another preferable aspect, the behavior of markers (step-like strip markers, for example) can be obtained by variance of marker intensity.

The force vector distribution reconstructing device comprises a transfer function by which force vectors or force vector distribution applied to the surface of the elastic body are reconstructed from information (movement vectors of each marker when an object contacts the surface, for example) obtained by photographing device as to behavior of markers. The transfer function is a function that associates force information applied to the surface of the sensor with information as to the behavior of markers (movement vectors, for example). The image information of markers is obtained by photographing the colored markers when the object contacts the sensing surface of the elastic body, and the information as to the behavior of markers is obtained from the image information of markers. In one aspect, the information as to the behavior of markers is obtained by comparing marker information in a contact state where the elastic body is contacted by an object and maker information in a normal state where the elastic body is free of an object. In one aspect, the marker information in the normal state may be stored in a memory device in the form of numerical information such as positional information or intensity information. The information as to the behavior of markers can be obtained from the image information of markers in the contact state and the pre-stored marker information in the normal state.

The force vector is obtained as an output by inputting the obtained information to the transfer function. The number of information as to the behavior of markers that is input to the transfer function is more than the number of force vectors to be obtained. Generally, the force vector distribution reconstructing device is comprised of a computer having a memory device and a processor. The transfer function is stored in the memory device and the calculation is performed by the processor. In one aspect, the force vector distribution device comprises a first processor for calculating the information as to the behavior of markers from the maker image information and a second processor for calculating the force vector from the information as to the behavior of markers. In one aspect, the first processor is a local processor and the second processor is a central processor.

The transfer function, depending on the shape of the elastic body, may be obtained based on an equation derived from theory of elasticity. However, when the surface of elastic body is an arbitrary curved surface, preferably, the transfer function is obtained by measurement or simulation. The transfer function by measurement or simulation can be obtained from information (movement vectors, for example) as to behavior of markers when x-directional force, y-directional force, and z-directional force having predetermined magnitude, for example, are applied to sampling points arranged on the surface of the sensor.

The steps for obtaining the transfer function by measurement comprises the following steps. A large number of sampling points are discretely arranged on the surface of the sensor. Information as to the behavior of markers when a force having predetermined magnitude is applied to each sampling point in each direction of predetermined directions is obtained. In one preferable aspect, the predetermined directions include x-direction, y-direction and z-direction. The transfer function can be obtained from the force with predetermined known magnitude applied to each sampling point in each direction of predetermined directions such as x-direction, y-direction and z-direction and the obtained information as to the behavior of markers.

In one preferable aspect, the optical tactile sensor with an arbitrary curved surface is a finger-shaped tactile sensor that comprises a transparent elastic body constituting a finger tip muscle, the surface of which constitutes a surface of the sensor. More preferably, the sensor further comprises a nail-like base provided at the back of the elastic body and the nail-like base fixes the elastic body. In one preferable aspect, the photographing device such as a camera is mounted on the nail-like base. In another preferable aspect, the sensor comprises a local processor and a central processor. The local processor calculates information as to the behavior of markers from the image information of markers and the central processor calculates force vector distribution from the information as to the behavior of markers by using the transfer function. Preferably, the local processor is mounted on the back of hand or palm of robot.

In another aspect, the optical tactile sensor with an arbitrary curved surface comprises a computer interface. As the computer interface, non-limiting example is a modeling tool for constructing three-dimensional graphics. In one preferable aspect, the optical tactile sensor used for the interface comprises a spherical elastic body or a partial spherical body having a spherical or partial spherical surface.

In one preferred aspect, the imaging device is arranged at a position opposite to the side of the transparent elastic body contacted by the object. Also, in the case where there exists a plurality of colored markers having different colors from each other, it is desirable to carry out convenient processing after imaging by selecting only markers of a particular color and looking at them separately. Selection of a particular color marker is carried out by, for example, using a color filter. It is desirably to provide a light shielding layer on the sensing surface to stabilize an image of markers.

In one preferred embodiment, a plurality of groups of markers are embedded in the transparent elastic body, each group of markers being made up of a large number of markers, markers constituting different marker groups having different colors for each group, and the marker groups having a different spatial arrangement. As an example of this differing spatial arrangement, a plurality of marker groups are arranged in a layered manner inside the elastic body. As an example of layered markers, the markers constituting the marker groups are microscopic spherical particles and the spherical markers constituting the marker group for each layer have different colors from each other. As another example of this differing spatial arrangement, a plurality of marker groups are arranged so as to intersect each other. As still another example of this differing spatial arrangement, each marker group is a plane group comprised of a plurality of planes extending in the same direction, and extending directions and colors thereof are different between each marker group. The shape of the colored markers is not particularly limited, and preferable examples can be spherical, cylindrical, columnar, strip shaped or flat.

DETAILED DESCRIPTION OF THE PREFERRED EMBODIMENT

Figure 1:
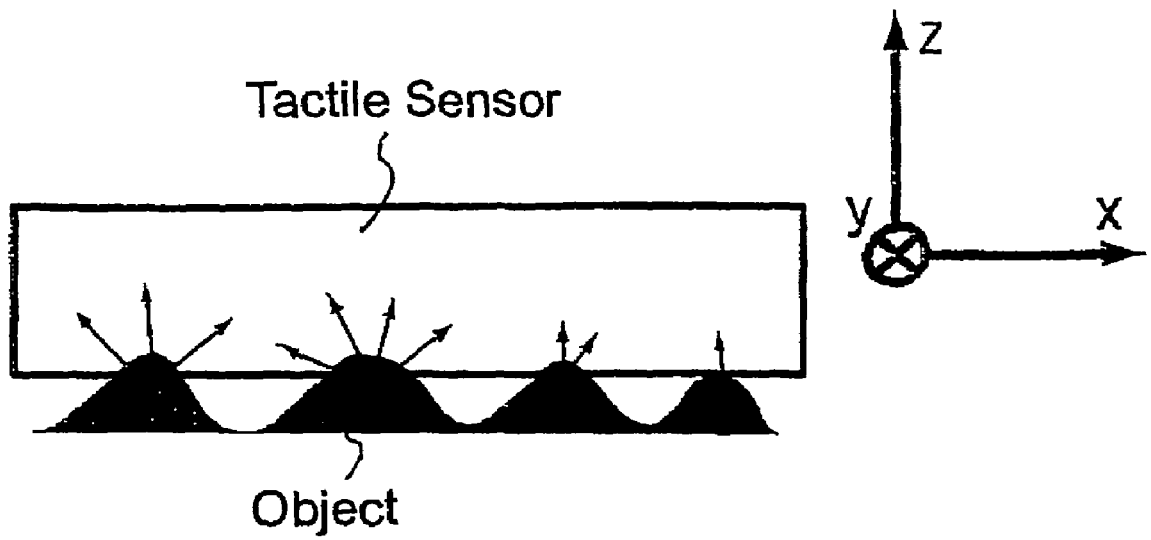
FIG. 1 is a view showing force vector distribution exerted between a tactile sensor and a contact object.
Figure 2:
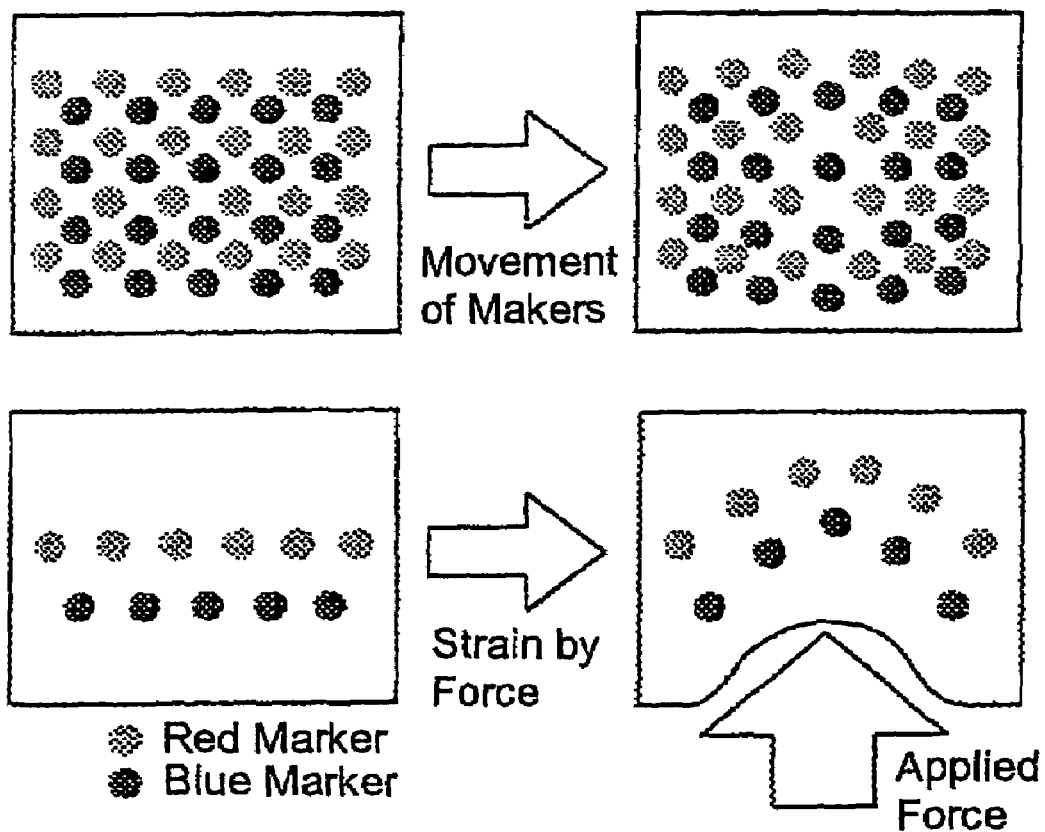
FIG. 2 is a view showing the principle of an optical tactile sensor.
Figure 3:
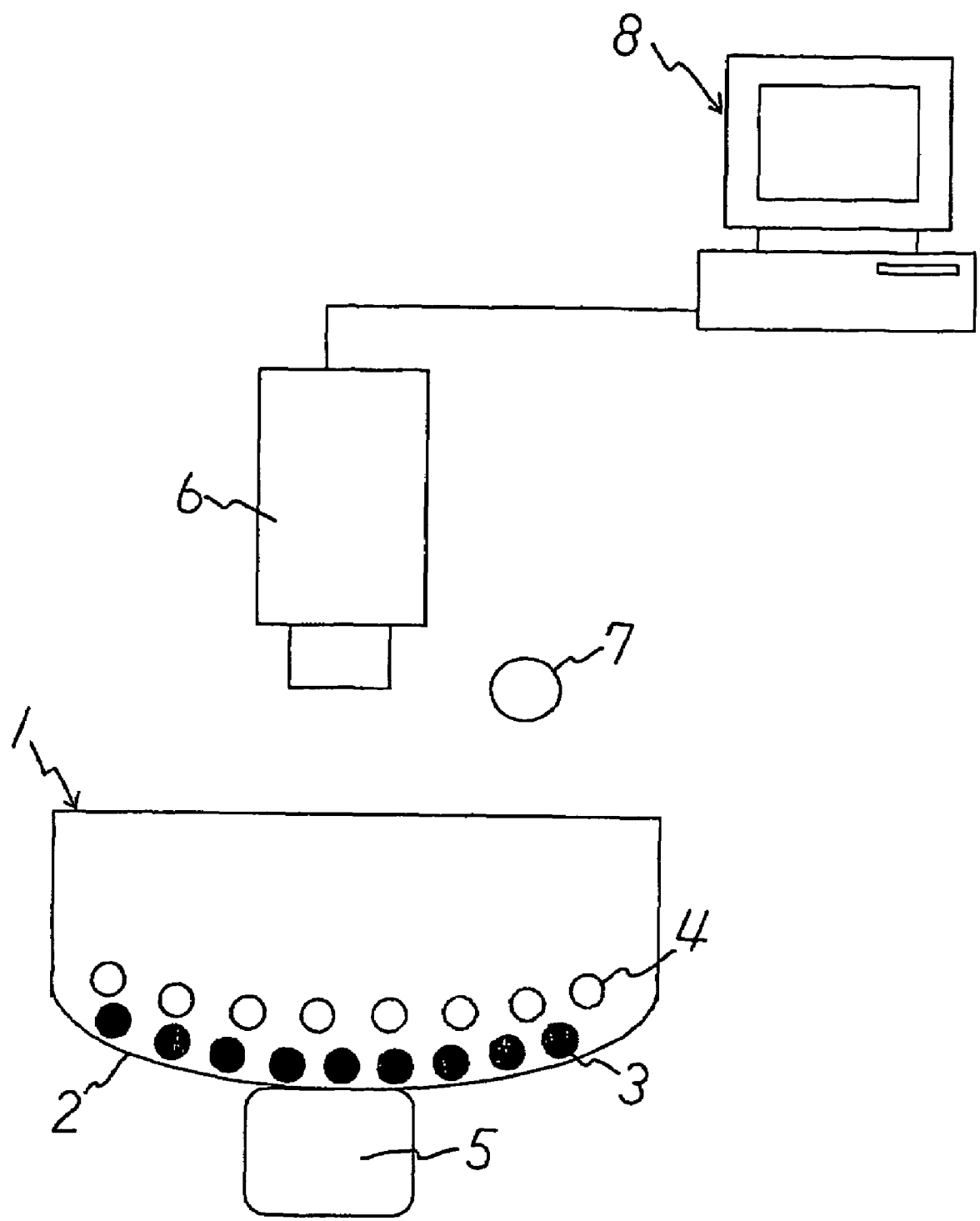
FIG. 3 is a schematic view showing the construction of a sensor of the present invention.

Referring to FIG. 3, the construction of an optical tactile sensor of the present invention is shown. The sensor comprises a transparent elastic body 1 formed of a transparent elastic material and a curved surface 2, or a surface for sensing. The transparent elastic body 1 is provided with a plurality of colored markers 3, 4 embedded in the transparent elastic body 1 in the vicinity of the surface 2 and along the curved surface 2. A sensing section is comprised of the transparent elastic body 1 and the colored markers 3, 4 arranged inside the elastic body.

The colored markers 3, 4 are comprised of two groups of colored markers and the two marker groups are embedded in different depths respectively from the surface 2. Colored markers 3 constituting one marker group and colored markers 4 constituting the other marker group have different colors to each other. For example, one marker group consists of a plurality of blue markers 3 and the other marker group consists of a plurality of red markers 4.

When an object 5 comes into contact with the transparent elastic body 1, the colored markers 3, 4 provided inside the transparent elastic body 1 are moved due to the internal strain of the elastic body. The sensor is also provided with a camera 6 as a photographing device and a light source 7. The optical camera 6 is arranged at a position on an opposite side to where an object 5 touches so that the transparent elastic body 1 is provided between the optical camera 6 and the object 5, and behavior or movement of the markers 3, 4 is photographed by the camera 6. The light source 7 may transmit light through a waveguide such as an optical fiber for example. Images of markers 3, 4 obtained by the photographing device are transmitted to a computer 8 constituting a force vector distribution device. The force vector distribution device comprises a processor, a memory device, a display device, an input device, an output device and other devices that are normally installed in a general-purpose computer. The processor calculates the marker information (movement vectors, for example) regarding the movement or motion of markers in the images. The processor further reconstructs the distribution of forces applied to the surface 2 by an object 5 using the marker information (movement information, for example) and a transfer function that is stored in the memory device.

The transparent elastic body 1 is preferably made of silicone rubber, but it can also be made from another elastic material such as another type of rubber or elastomer. The markers are preferably made from an elastic material, and more preferably made from the same material as the transparent elastic body 1. In one preferred embodiment, the colored markers are formed by adding pigment to silicone rubber. Since deformation of the elastic body should not be inhibited by the markers, the markers are also preferably made from an elastic material (preferably having the same elastic constant as the elastic body). The material of the markers is not particularly limited as long as the extent to which deformation of the elastic body is inhibited is sufficiently small. It is also possible for a part of the elastic body to constitute the markers.

With the present invention, a plurality of optical markers are distributed within the transparent elastic body 1, and information about the behavior (movement) of markers within the elastic body produced by contact is detected by the photographing device where the marker movements arise due to deformation of the elastic body 1 as a result of the object coming into contact with the elastic body 1. FIG. 3 shows two marker groups, but the number of marker group is not limited, and three marker groups may be located in a layered manner along the surface 2.

A camera, as a photographing device, is a digital camera, namely a camera for outputting image data as electrical signals, and in one preferred example is a CCD camera. It is also possible to use, for example, a digital camera using a C-MOS type image sensor. If three types of markers are prepared in red, green and blue, there are two methods of perceiving these three colors individually. The first method is to use color filters for separation where each marker can be regarded as being individually photographed directly by looking at RGB output from the camera. The second method is a method where imaging elements perceive only light intensity and light sources of red green and blue are prepared. When red is shone, light is only reflected from the red markers while the red light is absorbed by the markers of the other two colors, and so the camera effectively only perceives the red markers. If this is also carried out at separate times for green and blue, information equivalent to that using the first method can be acquired.

Figure 4:
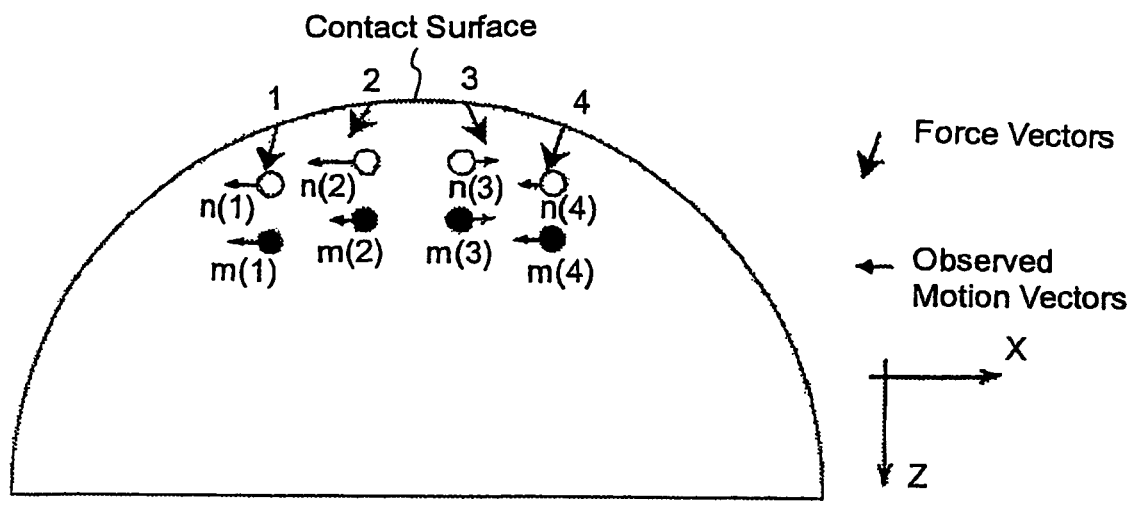
FIG. 4 is a view showing force vector distribution applied to a contact surface and movements of markers.

To obtain force vector distribution applied to a surface of the sensor from obtained information (movement vectors of markers, for example) as to behavior of markers by an optical tactile sensor, a transformation from information (movement information, for example) M as to the behavior of markers to force information F is required. The transformation from the marker information M to the force information F is obtained by an equation F=OHM. Referring to FIG. 4, a method of reconstructing the force vector distribution from the marker information will now be described based on a method of obtaining the force vector distribution from the movement vectors of markers. In FIG. 4, four arrows starting from the contact surface represent force vectors and eight horizontal arrows represent observed movement vectors of the markers. Here, though, for the purpose of simplification, only two-dimensional section (y-axial direction is omitted) is considered, an algorithm is the same for a general three-dimensional space.

Reference f refers to a force vector applied to a contact surface, and references m and n refer to a movement vector of a blue marker and movement vector of a red marker in the CCD element. Discrete finite points (four points in FIG. 4) are considered. As foregoing, force vector distribution has three components (x component, y component and z component), but only two components (x component and z component) are considered. Generally, taking an image by a camera means a projection of a three-dimensional object to a pixel plane of a two-dimensional plane so that marker movements only in the horizontal direction (x component and y component) are projected in the plane. Here, marker movement only in x direction component is observed.

Here, eight components, $f=[fx(1), fx(2), fx(3), fx(4), fz(1), fz(2), fz(3), fz(4)]$ are force vector distribution to be obtained, where $m=[m(1), m(2), m(3), m(4)]$ and $n=[n(1), n(2), n(3), n(4)]$ are movement vectors to be measured. The vectors m and n are represented as X. Namely, $X=[m(1), m(2), m(3), m(4), n(1), n(2), n(3), n(4)]$. Here, movement vectors m and n that are observed when a unit force (magnitude of 1) in the x-direction is applied to a point 1 are represented as Mx(1).

Namely, Mx(1)=[m(1), m(2), m(3), m(4), n(1), n(2), n(3), n(4)] when f=[1, 0 0, 0, 0, 0, 0]. Similarly, a movement vector of each marker when a unit force in the z-direction is applied to a point 1 are represented as Mz(1), a movement vector of each marker when a unit force in the x-direction is applied to a point 2 are represented as Mx(2), and so on. In case of a linear elastic body where linear summation relationship holds between applied forces and strains (most elastic bodies meet this characteristics), movement vectors are represented as $$X = Mx(1) \times fx(1) + Mz(1) \times fz(1) + Mx(2) \times fx(2) + \ldots + Mz(4) \times fz(4),$$

when general forces f=[fx(1),fx(2),fx(3),fx(4),fz(1),fz(2),fz(3),fz(4)] are given. Conversely, the fact that the movement vectors can be represented as foregoing means that superposition of forces holds, therefore, the elastic body is a linear elastic body.

When the equation is represented as a matrix form, X=H×f, where H=[Mx(1); Mx(2); . . . ; Mz(4)]. The H is called a transfer function because the H is a map that transfers a force f to deformation x. The matrix form written with an element is the following.

$$\begin{bmatrix} m(1) \\ m(2) \\ m(3) \\ m(4) \\ n(1) \\ n(2) \\ n(3) \\ n(4) \end{bmatrix} = \begin{bmatrix} Hmx(1,1) & Hmz(1,1) & Hmx(1,2) & Hmz(1,2) & Hmx(1,3) & Hmz(1,3) & Hmx(1,4) & Hmz(1,4) \\ Hmx(2,1) & Hmz(2,1) & Hmx(2,2) & Hmz(2,2) & Hmx(2,3) & Hmz(2,3) & Hmx(2,4) & Hmz(2,4) \\ Hmx(3,1) & Hmz(3,1) & Hmx(3,2) & Hmz(3,2) & Hmx(3,3) & Hmz(3,3) & Hmx(3,4) & Hmz(3,4) \\ Hmx(4,1) & Hmz(4,1) & Hmx(4,2) & Hmz(4,2) & Hmx(4,3) & Hmz(4,3) & Hmx(4,4) & Hmz(4,4) \\ Hnx(1,1) & Hnz(1,1) & Hnx(1,2) & Hnz(1,2) & Hnx(1,3) & Hnz(1,3) & Hnx(1,4) & Hnz(1,4) \\ Hnx(2,1) & Hnz(2,1) & Hnx(2,2) & Hnz(2,2) & Hnx(2,3) & Hnz(2,3) & Hnx(2,4) & Hnz(2,4) \\ Hnx(3,1) & Hnz(3,1) & Hnx(3,2) & Hnz(3,2) & Hnx(3,3) & Hnz(3,3) & Hnx(3,4) & Hnz(3,4) \\ Hnx(4,1) & Hnz(4,1) & Hnx(4,2) & Hnz(4,2) & Hnx(4,3) & Hnz(4,3) & Hnx(4,4) & Hnz(4,4) \end{bmatrix} \begin{bmatrix} fx(1) \\ fz(1) \\ fx(2) \\ fz(2) \\ fx(3) \\ fz(3) \\ fx(4) \\ fz(4) \end{bmatrix}$$

where Hmx(x1, x2) represents a displacement amount in x-direction of m marker in a certain depth at a coordinate x=x1 with a unit force in the x-direction applied to a surface at a coordinate x=x2. Similarly, Hnz(x1, x2) represents a displacement amount in z-direction of n marker in a certain depth at a coordinate x=x1 with a unit force in the z-direction applied to a surface at a coordinate x=x2.

This is a simple multiplication of matrices where reference x is 1×8 matrix reference H is 8×8 square matrix, and reference f comprises 1×8 components. Thus, f can be obtained from observed x by multiplying an inverse matrix of H. Namely, f=inv(H)×X (Equation 1) where inv represents inverse matrix (generalized matrix inverse).

The matrix form written with an element is the following.

where Imx(1,1) and the like represent each element of inv(H) and represent contribution of m(1) for calculating fx(1).

The important thing is that the number of observed data must be equal to or more than the number of unknowns when determining unknowns by using an inverse matrix defined by a transfer function. If the requirements are not met, it is quite difficult to obtain the inverse matrix, namely, the number of unknowns is redundant and the unknowns cannot be precisely obtained. In the example shown in FIG. 4, if there is only one marker layer, force vector components cannot be precisely determined because only four movement vector components are observed whereas distribution of eight force vectors is to be obtained (this is the case with the conventional surface distribution type tactile sensor). To solve this problem, the present invention employs two layers of differentially colored marker groups so as to increase the number of independent observed data up to eight by observing a movement of each marker in the two layered marker groups.

In case of three-dimensional space (where y-axis is added to the drawing), at a point, a force vector has three degrees of freedom, and a horizontal movement vector of markers has two degrees of freedom. If the number of sampling points is four, the number of unknowns f is twelve, where f=[fx(1), fy(1), fz(1), fx(2), fy(2), fz(2), fx(3), fy(3), fz(3), fx(4), fy(4), fz(4)], whereas the number of observed movement vectors is eight and is insufficient, where m=[mx(1), my(1), mx(2), my(2), mx(3), my(3), mx(4), my(4)].

By providing two layered markers, it is possible to obtain sixteen observed data by observing the layered markers and to determine twelve unknowns. Due to redundancy in the number of obtained information, robust extrapolation can be performed. Using the foregoing algorithms, the force vectors are extrapolated from the CCD image. Even with other measurement methods of the present invention using other types of marker configurations as shown in FIGS. 10 to 13, for example, the measurement methods are substantially the same.

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \\ Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

From the foregoing description, it is essentially important for the optical tactile sensor of the present invention to obtain the transfer function (matrix H) representing the relationship between the surface stress and the internal strain of the elastic body. In this regard, the present optical tactile sensor is inherently different than the conventional matrix-type tactile sensors. Though the conventional matrix-type tactile sensor (the sensor by Shimojo, for example) comprises an elastic body layer provided on a sensor element, it only measures a force applied to each arrayed sensor element and does not calculate force vector distribution applied on an elastic body surface.

Next, a method of obtaining the transfer function will be described. Theory of elasticity basically leads an equation that holds between a force applied to a surface (x=0, Δx, y=0, Δy, z=0, Δz) of an internal microscopic region (a micro cube Δx×Δy Δz, for example) and strain of the microscopic region (d Δx/dx, d Δy/dx, d Δz/dx, d Δx/dy, d Δy/dy, d Δz/dy, d Δx/dz, d Δy/dz, d Δy/dz). An overall elastic body is comprised of (spatially integrated) infinite number of the microscopic regions.

In an elastic body having a characteristic shape (a semi-infinite elastic body, for example), as a function defining a force applied to a surface and an internal strain, a function where the foregoing equation held in the microscopic region can hold in any regions of the internal portion of the elastic body has been found as a numerical equation. In this case, a matrix H can be obtained by substituting coordinates of finely divided elastic body surfaces and coordinates of internal markers into the function.

Here, the numerical equation is a function G by which the internal strain can be obtained from the surface stress in the form of m(x2, y2)=G(f(x1), x2, y2), where f(x1) represents surface stress and m(x2, y2) represent internal strain. For example, when a force is applied to a point 1 in FIG. 4, displacement of marker 2 can be obtained by m(2, y2)=G(f (1), 2, y2), where y2 is a known marker depth.

However, such characteristic shape is rare, for example, even with a spherical body, a function for the relationship between surface stress and internal strain has not been found. According to the related optical tactile sensor, a matrix H is obtained using the foregoing equation assuming that an elastic body is a semi-infinite elastic body. It is found that surface stress cannot be correctly obtained when the equation for semi-infinite elastic body is applied for an arbitrary curved surface such as a hemispherical surface. It is therefore necessary to associate a surface stress with an internal strain by any other means.

A first method is to associate a surface stress with an internal strain by numerical simulation. According to a commercially available elasticity simulation software, by dividing an elastic body into meshes, it is possible to numerically calculate elastic deformation that holds for the relationship between surface stress and strain of each mesh (above-mentioned microscopic region) and the relationship between the adjacent meshes where forces having the same magnitude are exerted at an interface. Therefore, by dividing the surface of the sensor into meshes, it is possible to calculate the movement amount of markers when a unit force is applied to each mesh in x-direction, y-direction and z-direction by simulation.

Figure 5:
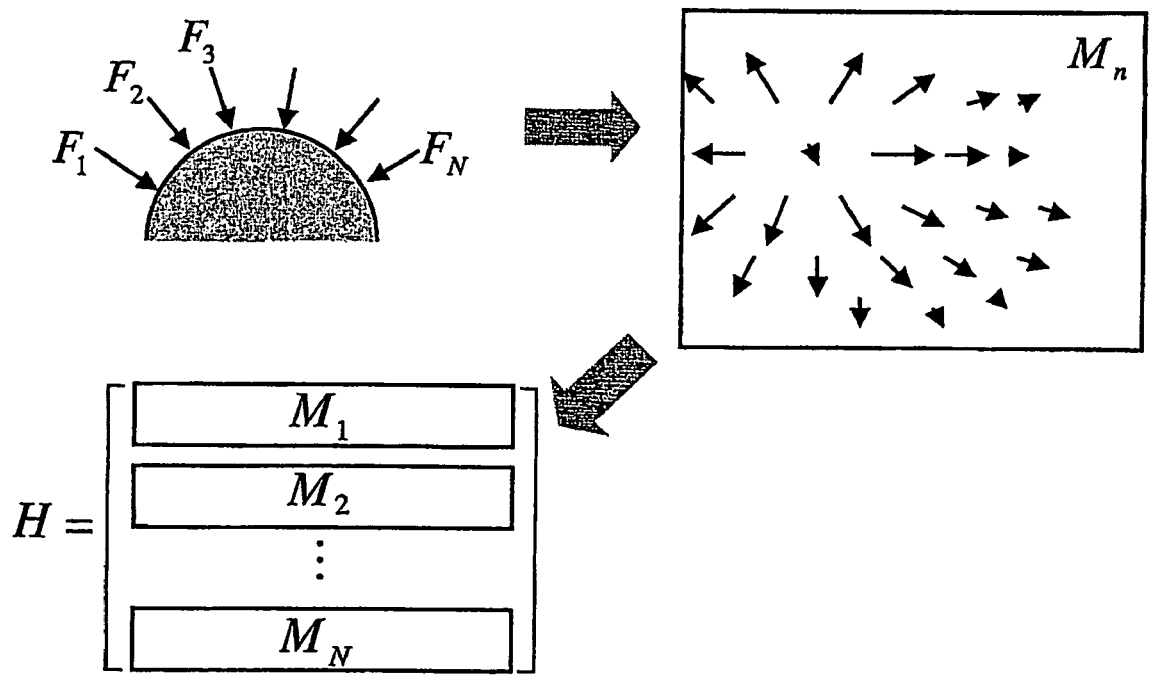
FIG. 5 is a view showing a method of making a transfer function for reconstructing force vector distribution by measurement.

A second method is to actually apply a force to the surface as shown in FIG. 5. Forces F1, F2, F3, F4 . . . , Fn having known magnitude are applied to an arbitrary curved surface of elastic body. Movement vectors (Movements of markers caused by each known force) M1, M2, M3, M4, . . . , Mn of markers as to each force applied are measured and stored. F1 represents three vectors F1x, F1y, F1z and movement vectors of respective markers are given as M1x, M1y, M1z when these forces are applied. A matrix H is obtained from the forces having known magnitude and obtained information (movement vector). The transfer function H is prepared by using each movement of markers Mn. The second method will be explained in detail.

Firstly, discretely arranging numerous sampling points on the surface of elastic body. In one preferable aspect, the sampling points are arranged so as to cover an overall area of the surface. In one aspect, numerous discrete sampling points are arranged (concentrically arranged in plan view) according to curvilinear coordinates. In another aspect, the sampling points are arranged to provide a grid arrangement in a plan view.

At each sampling point, information that associates forces having known magnitude applied in x-direction, y-direction, and z-direction with corresponding movement vectors of markers when the forces are applied is obtained. In one preferable method, forces having the predetermined magnitude are independently applied to each sampling point in x-direction, y-direction and z-direction, and each movement vector of markers is measured and stored. Orientations of x-direction, y-direction and x-direction of force vectors applied on the sampling points are not limited as long as an arbitrary force applied to the surface can be represented by using these force vectors.

In one aspect, a tangential plane is provided at a sampling point, x-direction and y-direction are determined in the orthogonal direction to each other in the plane, and z-direction is determined in an orthogonal direction as to the plane. Alternatively, x-y plane is set regardless of the shape of surface, and z-direction is set in an orthogonal direction as to the x-y plane.

Forces applied to each sampling point have known magnitude, and in one preferable aspect, a force with constant magnitude, 100 [gf] for example, is applied to the sampling point in x-direction, y-direction, and z-direction, respectively and movement vectors of each instance are measured. It is not necessary that forces applied to each sampling point have the same magnitude as long as the magnitude of each force is known. Movement vector of markers may be measured based on forces having different magnitudes, and later on, the magnitude of movement vector can be normalized.

As long as information that associates forces in x-direction, y-direction, and z-direction with movement vectors of markers eventually is obtained, directions of forces applied to each sampling point are not limited to x-direction, y-direction and z-direction. Assume that an elastic body is a linear elastic body, the following method is also considered. First, applying a force to a point in z-direction, and a movement amount of each marker is measured and stored. Next, applying a force to the point in xy-direction, and a component in x-direction can be obtained by subtracting the force component in z-direction from the xz component. This is the same for the y-direction.

It will be explained by using an equation.

Suppose that $Mz(n,m)$ represents a movement of marker when a force is applied to a grid point n, m in z-direction, $Mx(n,m)$ represents a movement of marker when a force is applied to a grid point n, m in x-direction, $Mxz(n,m)$ represents a movement of marker when a force is applied to a grid point n, m in xz-direction, it can be considered that Mxz(n,m)=Mx(n,m)+Mz(n,m), and Mx(n,m) can be calculated if Mz(n,m) and Mxz(n,m) are known.

This is the same for a situation where a force is applied to a plurality of grid points not to one point and the applied force can be divided.

As foregoing, the matrix H can be obtained by simulation or measurement where the matrix H is the transfer function that associates force information F with information M as to the behavior of marker (movement information, for example). The optical tactile sensor comprises a memory device and a processor. The matrix H obtained is stored in the memory device. A marker image is obtained by a photographing device when an object contacts the transparent elastic body and an arbitrary force is applied to a surface of a sensor. A movement vector of marker is measured from the obtained marker image by the processor. The measured movement vector of marker is input to the matrix H and calculated by the processor, thereby outputting force vector that is applied to the surface of the elastic body.

Embodiments of an optical tactile sensor with an arbitrary curved surface will be described.

Figure 6:
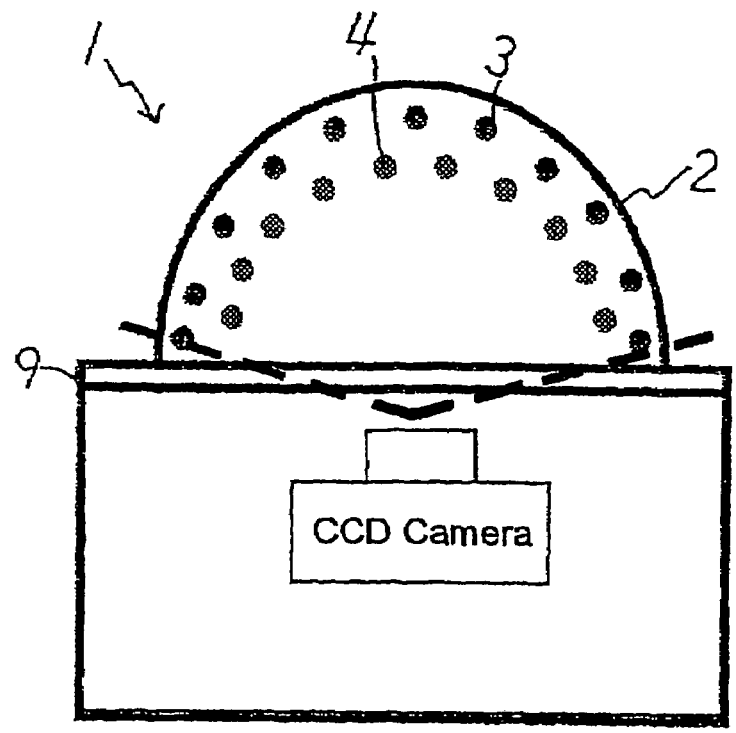
FIG. 6 is a schematic view showing an embodiment of hemispherical tactile sensor.

Referring to FIG. 6, a semi-spherically shaped or hemispherical tactile sensor is shown. A transparent elastic body 1 constituting a tactile portion of the tactile sensor has a semi-spherical shape and comprises a semi-spherically shaped surface and a circular bottom plane. The semi-spherically shaped surface constitutes a surface 2. The transparent elastic body 1 is a semi-spherical body having a radius of 25 mm and is made of a silicone. A black light shielding layer is provided on the surface 2 so as to stabilize a marker image obtained by the CCD camera.

The blue spherical markers 3 are arranged in a depth of 2 mm from the sensing surface 2, along the curved surface of the surface 2 to provide a blue spherical marker group. The red spherical markers 4 are arranged in a depth of 3.5 mm from the surface 2, along the blue spherical marker group to provide a red spherical marker group. An interval between markers is 4 mm. The markers 3, 4 are colored plastic spherical body. The bottom plane of the transparent elastic body is fixed to a transparent acrylic plate 9. A CCD camera is provided such that the camera is opposed to the bottom plane through the transparent acrylic plate 9. A light source (not shown) is provided in the vicinity of the CCD camera. Movements of markers inside the elastic body 1 are photographed by the CCD camera through the acrylic plate 9. An image as a NTSC output is transmitted to a computer via a capture unit using a USB connection.

Though the figure shows a hemispherical tactile portion, the tactile portion may comprise a substantially spherical surface or a potion of spherical surface. The portion of spherical shape may be a shape where sensing portion may have a substantially spherical shape or a partial spherical shape. If the shape of tactile portion is close to a sphere, the wider viewing angle is required by the photographing device. Non-limiting example of such photographing device is a photographing device employing a fish eye lens.

In one preferable aspect, the tactile sensor having a surface with a spherical or partial spherical surface constitutes an input device such as a mouse and keyboard, and other computer interfaces. More specifically, the tactile sensor having a surface with a spherical or partial spherical surface may comprise an interface for modeling tool that provides three-dimensional graphics by just like handling clay on a computer screen. By squeezing, pinching, or rubbing the surface, the sensor senses forces applied to the surface, and information obtained is transmitted to a processor of the computer so as to deform the shape of an object shown in the screen, or polish the surface of an object.

Figure 7:
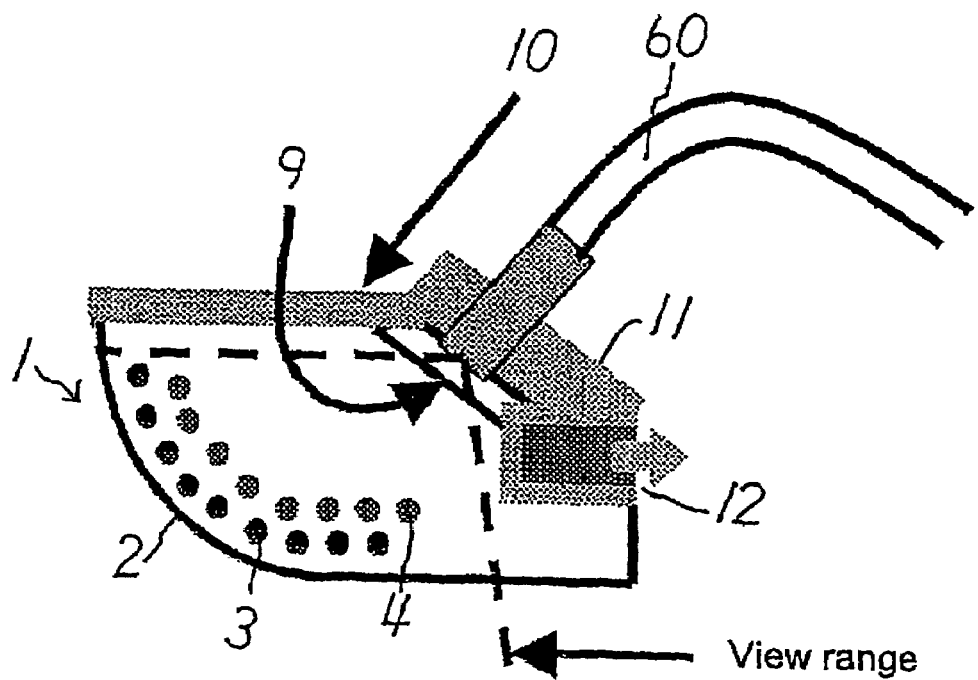
FIG. 7 is a schematic view showing an embodiment of finger-shaped tactile sensor.

Referring to FIG. 7, a finger-shaped optical tactile sensor is shown. The finger-shaped tactile sensor has a shape that is similar to the shape of a human finger tip. A portion corresponding to a digital pulp or a finger tip muscle or a pad of a finger is made of a transparent elastic body 1 and a portion corresponding to a finger tip surface constitutes a surface 2. A surface opposite to the surface of the finger tip muscle is provided with a nail-like member 10 made of aluminum. The finger-shaped tactile sensor has an overall shape with height 23 mm, vertical 35 mm and transverse 23 mm. The transparent elastic body 1 is made of silicone. The surface 2 of the transparent elastic body 1 has a curved surface similar to the surface or contour of an actual digital pulp or pad of a finger.

In the transparent elastic body 1 constituting a finger tip muscle, a number of blue spherical markers 3 are arranged in a depth of 2 mm from the curved surface 2 and along the curved surface 2 with an interval of 3 mm, and the blue spherical markers 3 constitute a blue spherical marker group. A number of red spherical markers 4 are arranged in a depth of 3 mm from the curved sensing surface 2 and along the blue spherical marker group with an interval of 2 mm, and the red spherical markers 4 constitute a red spherical marker group. The surface 2 is provided with a black light shielding layer. By providing the light shielding layer, it is possible to stabilize a marker image photographed by the CCD camera.

An end of nail-like base 10 is integrally provided with an inclined portion 11 opposed to the surface 2 constituting a finger tip surface. The inclined portion 11 constitutes a mounting member for mounting a photographing device 60. The photographing device 60 comprises a video scope having a CCD element at distal end, and the proximal end of the video scope is connected to a computer. The CCD element is mounted at the inclined portion 11 such that the CCD element faces the finger tip surface, i.e. the surface 2 and markers 3, 4. At the elastic body side of the inclined portion 11, a transparent acrylic plate 9 is provided between the elastic body and the CCD element. A light source (not shown) is provided in the vicinity of the CCD element. The markers 3, 4 inside the elastic body 1 are photographed by the video scope and the image is transmitted to the computer.

At an end of the inclined portion 11, a mounting portion 12 is provided for detachably mounting tactile sensor body to a robot hand. According to the sensor shown in FIG. 7, the mounting portion 12 is provided with an internal thread into which a screw (not shown) of a robot hand is threaded such that the tactile body is supported by the robot hand. In FIG. 7, the finger-shaped tactile sensor does not include a member corresponding to the distal phalanx of the actual finger tip but the mounting portion 12 is positioned at an joint between the distal phalanx and the middle phalanx so that the mounting portion 12 may correspond to an joint or a portion of finger bone.

Mounting means for mounting a tactile portion to a robot hand is not limited to the described means. The photographing device such as a CCD element may be provided at a portion where the internal thread is provided. It is also possible to provide a distal end of optical fiber for facing the transparent elastic body and to provide the CCD element constituting the photographing device at a position distance from the elastic body. Specifically, the finger shaped tactile sensors are provided at each finger tip of five fingers and marker information from each finger shaped tactile sensor may be photographed by a common CCD element and transmitted to a computer.

However, the finger shaped tactile sensor employing a video scope or an optical fiber has a disadvantage in that a wide viewing angle cannot be obtained. For providing a compact finger-shaped sensor, the viewing angle of 90 degrees or more is desired. If the viewing angle is insufficient, it is necessary to photograph the markers from the distant position and it is impossible to make the sensor smaller. In addition, lenses for optical fiber or video scope only have a viewing angle of about 60 degrees. Further, with an optical fiber, it is difficult to acquire sufficient resolution.

Figure 8:
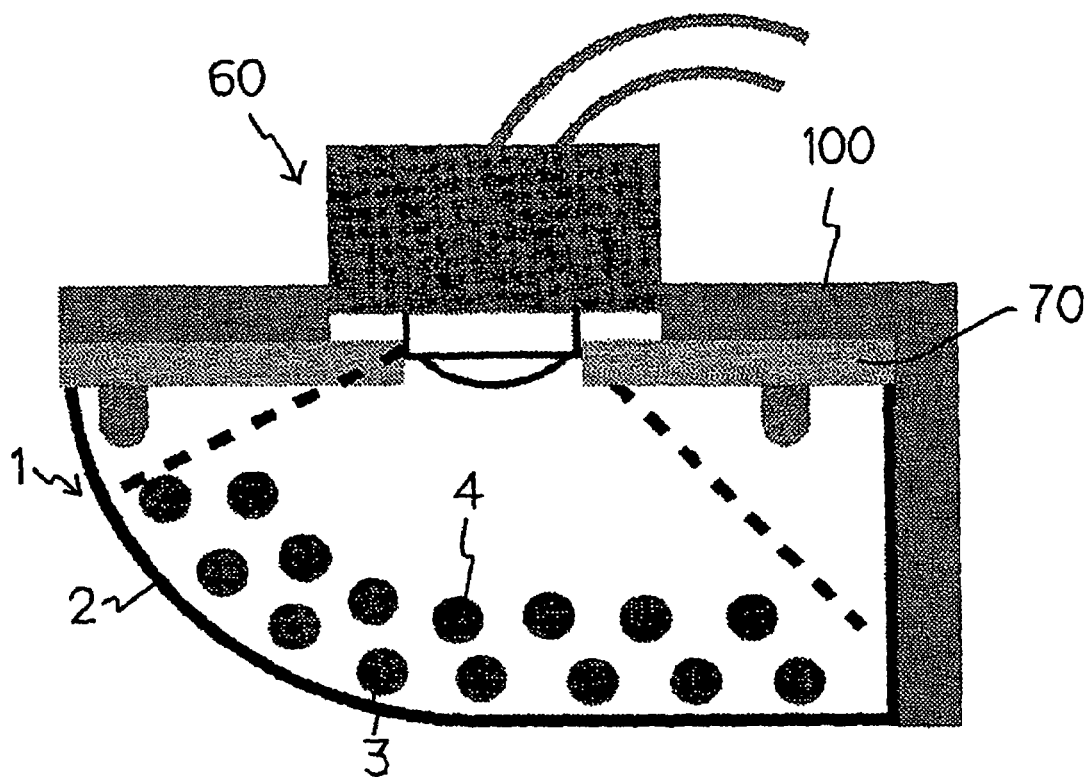
FIG. 8 is a schematic view showing another embodiment of finger-shaped tactile sensor.

Referring to FIG. 8, another embodiment of finger shaped tactile sensor for solving the above problems is shown. The finger-shaped tactile sensor has a shape that is similar to the shape of a human finger tip. A portion corresponding to a digital pulp or a finger tip muscle is made of a transparent elastic body 1 and a portion corresponding to a finger tip surface constitutes a surface 2. A surface opposite to the surface of the finger tip muscle is provided with a nail-like member 100 made of aluminum. The transparent elastic body 1 is made of silicone. The surface 2 of the transparent elastic body 1 has a curved surface similar to the surface or contour of an actual digital pulp. In the transparent elastic body 1, a number of blue spherical markers 3 constituting a blue marker group and a number of red spherical markers constituting a red marker group are arranged in different depths from the curved surface. The surface 2 is provided with a black light shielding layer. The nail-like member 100 is provided at the back of the transparent elastic body 1 and supports the transparent elastic body 1.

A photographing device 60 is comprised of a photographing element 60 such as a CCD element or CMOS element and a lens with a viewing angel of more than 90 degrees (110 degrees in the embodiment). The nail-like member 100 has an aperture therein for mounting the photographing device 60: The photographing element is mounted on the aperture of the nail-like member 100 with the lens facing the embedded markers 3, 4 and surface. A plate 70 for conducting light therethrough is provided between the nail-like member 100 and the transparent elastic body 2. The plate 70 acts as a light guide or source.

Figure 9:
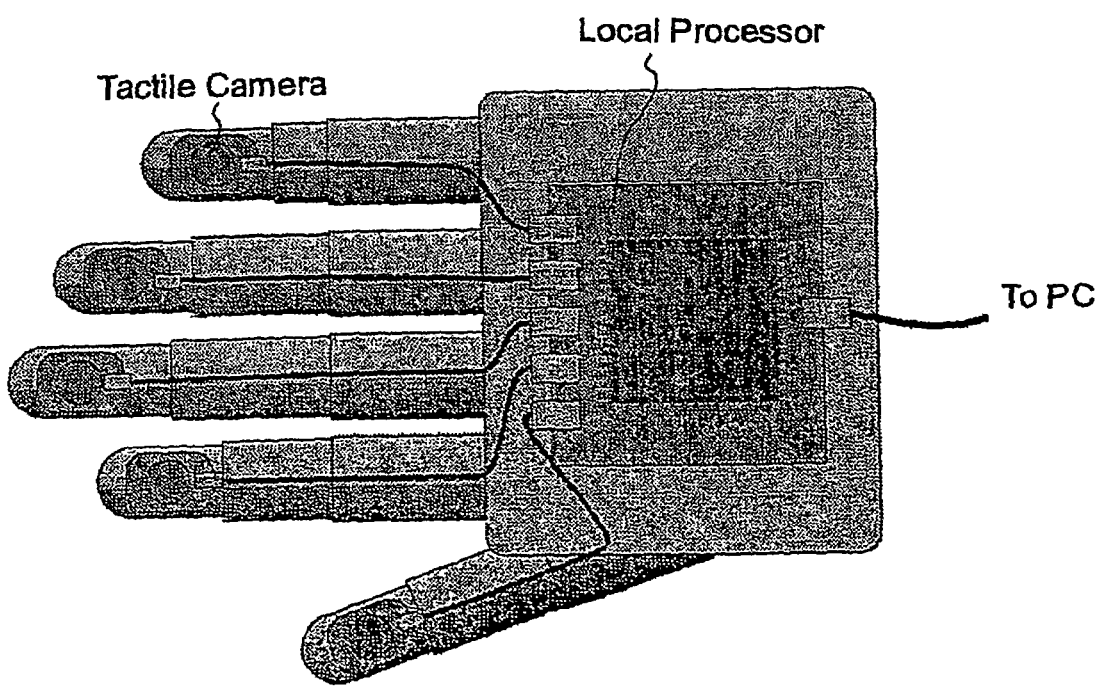
FIG. 9 is a schematic view showing still another embodiment of finger-shaped tactile sensor.

Referring to FIG. 9, still another embodiment of a finger-shaped tactile sensor is shown. As shown in FIG. 9, each finger tip of five fingers is provided with a tactile portion comprising a transparent elastic body with markers and a photographing device such as a camera. The finger-shaped tactile sensor of FIG. 9 comprises a local processor and a central processor (not shown). The local processor is provided at a proximal side, and at a portion corresponding to the back of a hand or a palm for example. Non-limiting example of the local processor is a FPGA device. The central processor is provided at a distal side. Each camera installed on the finger tips is electrically connected to the local processor such that each data obtained by each camera is transmitted to the local processor where information as to marker movements is calculated from the obtained image information of markers. The local processor is electrically connected to the central processor such that the information as to the marker movements is transmitted to the central processor where force vector distribution is calculated from the information as to the maker movements. Since image information contains a great amount of information, it is difficult to transfer the image information through data transfer standard such as USB and IEEE1394 with a desired speed. According to the arrangement shown in FIG. 9, information required for reconstructing force vector distribution (information as to maker movements, for example) is extracted by the local processor provided near the camera and only the extracted information, amount of which is greatly reduced from the original image data is transferred to the central processor.

Though the present invention is described based on the spherical markers as one of preferable aspects, the shape and/or arrangement of markers are not limited to the foregoing. Referring to FIGS. 10 to 13, other shapes and arrangements of markers will now be described. Detail descriptions of these markers are described in WO02/18893 A1 and incorporated herein by reference. Further, the shape and/or arrangement of markers are not limited to the drawings of the present application and WO02/18893 A1. Though, in FIG. 12 and FIG. 13, a tactile body having a flat contact surface is shown, the arrangements of these markers can be applied to a tactile body having an arbitrary curved surface.

Figure 10:
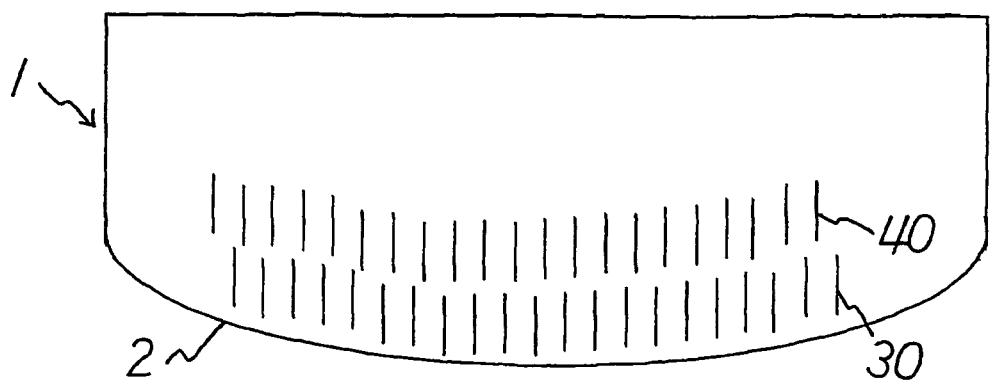
FIG. 10 is a schematic view showing an embodiment of marker configuration.

Referring to FIG. 10, colored markers being comprised of extremely thin cylinders or columns having microscopic cross sections are shown. Two marker groups are arranged at different depths from the surface 2. A marker group made up of extremely thin blue cylindrical markers 40 is embedded in a section of transparent elastic body 1 in the vicinity of a surface 2. Another marker group made up of extremely thin red cylindrical markers 30 is embedded in a section that is deeper than the red marker group. The markers 30, 40 are embedded vertically inside a transparent elastic body. The markers 30, 40 extend along imaginary lines connecting an object coming into contact with the elastic body and a camera. The number of marker group is not limited to two but it is possible to provide three or more groups of marker each having different depths from the surface in the elastic body.

Figure 11:
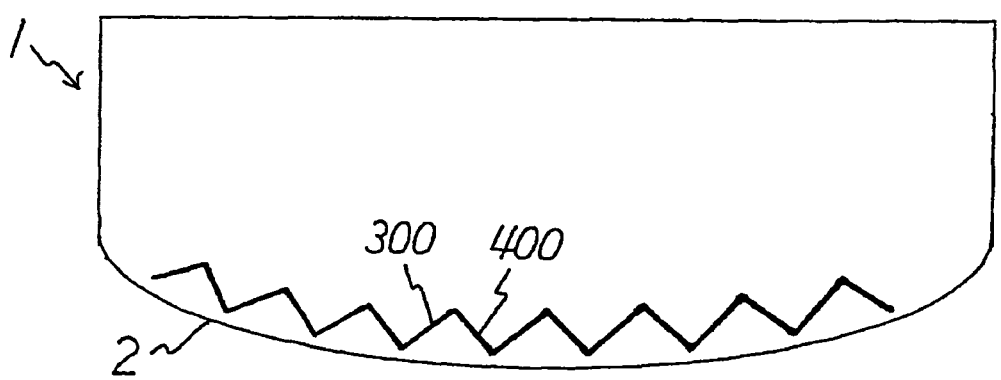
FIG. 11 is a view showing another embodiment of marker configuration.
Figure 11:
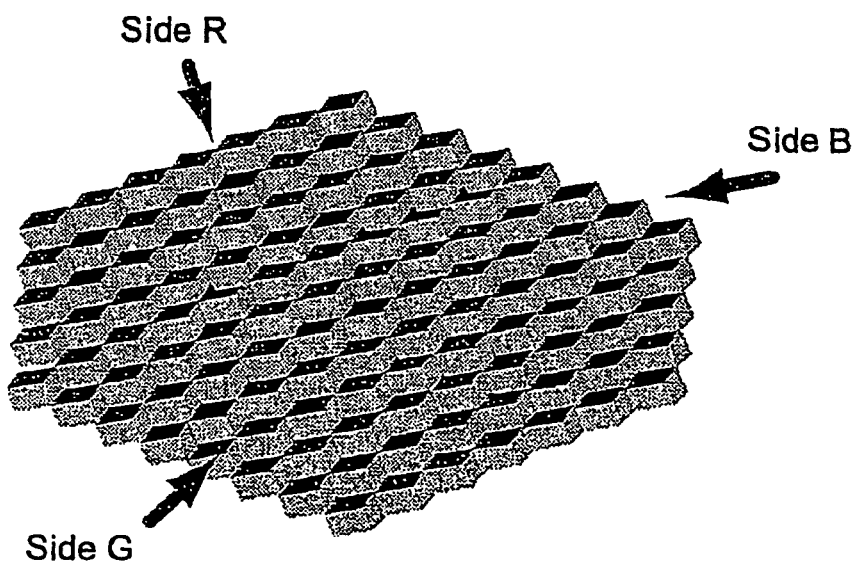

Referring to an upper view of FIG. 11, inclined plane markers 300, 400 are arranged in the elastic body 1 in a step-like fashion. In one preferable aspect, parts (a step-shaped interface) of the elastic body 1 constitute markers 300, 400. In another aspect, separate plane markers may be embedded in the elastic body 1. The interface can be divided into two surface groups, all surfaces in a group having the same direction. The surfaces in each group are made the same color (here one interface 300 is blue, and the other interface 400 is red). It is possible to acquire observation values containing vertical and horizontal components of force vectors at a particular point as information by observation of intensity of the two colors at that point. By sensing the observed intensity, it is possible to reconstruct surface distribution of force vectors.

Figure 12:
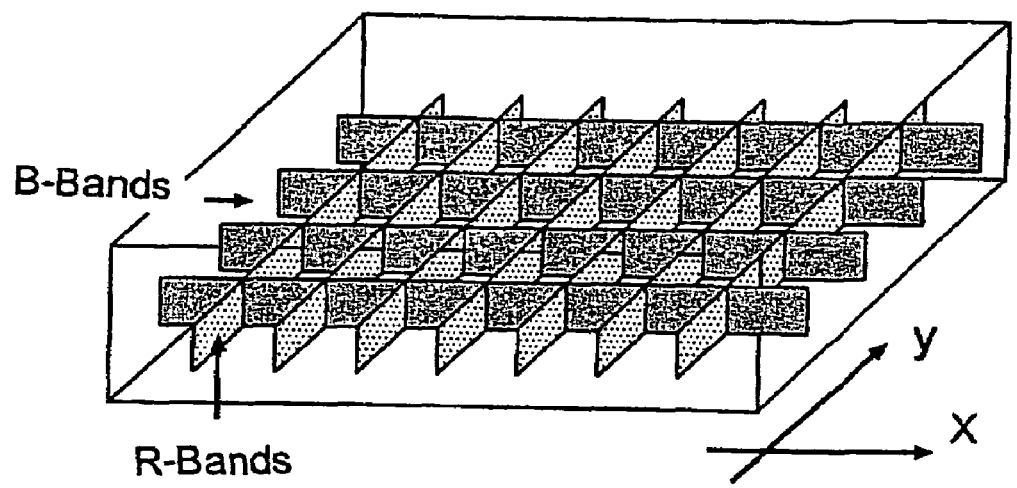
FIG. 12 is a view showing another embodiment of marker configuration.

A method using two colors has been described based on the upper view of FIG. 11, but as shown in a lower view of FIG. 12, using so called pyramid manufacturing where microscopic cubes are gathered at a bottom surface, if three groups of surfaces facing in the same direction are respectively made the same color (for example, red, green and blue), then similarly to the previous discussion it is possible to respectively obtain two degrees of freedom for force acting in a horizontal direction on a contact surface as intensity ratios for three colors, and force acting in a vertical direction using a total intensity of the three colors.

Referring to FIG. 12, two marker groups 200A (marker group comprising a plurality of thin red strips arranged in a row) and 200B (marker group comprising a plurality of thin blue strips arranged in a row) are aligned so that respective markers are orthogonal to each other, but the spatial arrangement relationship between the plurality of marker groups is not limited. It is also possible for the two sides of the strips constituting the marker to have different colors. In FIG. 11, side portions of the strip markers extend along an observation direction but the side portions of the strip markers may be inclined to an observation direction.

Figure 13:
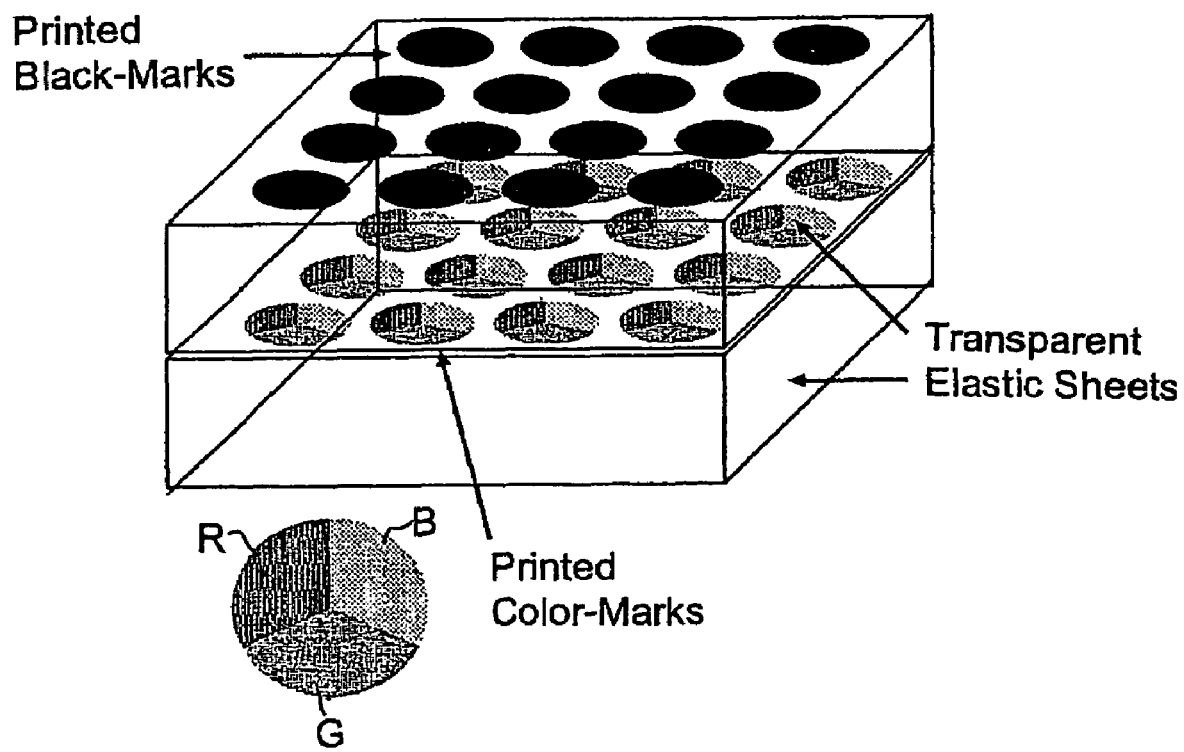
FIG. 13 is a view showing still another embodiment of marker configuration.

FIG. 13 shows a sensing part having a plurality of plane markers. The plane markers are normally concealed by concealment markers and each plane marker is partitioned into a plurality of portions having different colors for each portion, and the partitioned portions having the same color constitute each marker group. The plane markers and said concealment markers are provided and spaced with each other in the elastic body, and an arrangement is made such that said the markers are concealed by the concealment markers and not observed in a state where external force is not acting on the transparent elastic body. When shear strain arises, the positions of the concealment markers 6 and the colored markers 20 become offset, giving color. With the sensor in the drawing, the markers are coated with three colors RGB, and it is possible to ascertain the strain direction from the color produced.

INDUSTRIAL APPLICABILITY

The present invention can be widely applied to tactile sensors, and as an applied example can be used in a tactile sensor for a robot hand and an interface for a computer.

The invention claimed is:

1. An optical tactile sensor comprising:
a sensing part comprising a transparent elastic body and a plurality of marker groups provided in said body, each marker group being comprised of a number of colored markers, with markers constituting different marker groups having different colors for each group, said transparent elastic body having an arbitrarily curved surface to be contacted by an object;
a photographing device for taking an image of behavior of colored markers when said arbitrarily curved surface of said transparent elastic body is contacted by the object to obtain image information of markers, and
a force vector distribution reconstructing device including a transfer function by which a force vector applied to the arbitrarily curved surface is reconstructed from information as to the behavior of markers that is obtained from the image information of the colored markers, said force vector distribution reconstructing device reconstructing forces applied to said arbitrarily curved surface from said information as to the behavior of markers by using the transfer function wherein said transfer function is obtained by measurement or simulation;
wherein said transfer function is obtained from information as to behavior of markers when forces having predetermined magnitude in predetermined directions are applied to sampling points arranged on the arbitrarily curved surface.

2. The sensor of claim 1, wherein said predetermined directions include x-direction, y-direction and z-direction.

3. The sensor of claim 1, wherein said sensor comprises a finger-shaped sensor having a finger pad section shaped like a pad of a finger and a finger tip surface, and wherein the transparent elastic body constitutes the finger pad section and the surface of the elastic body constitutes the finger tip surface.

4. The sensor of claim 3, wherein a nail-like base is provided on the back of said transparent elastic body, and wherein said nail-like base supports said transparent elastic body.

5. The sensor of claim 4, wherein the photographing device is mounted on said nail-like base and is opposed to said finger tip surface.

6. The sensor of claim 4, wherein the photographing device is mounted on an end portion of said nail body and is opposed to said finger tip surface.

7. The sensor of claim 1, wherein said surface of the transparent elastic body comprises a spherical shape or a portion of spherical shape including a hemispherical shape.

8. The sensor of claim 1, wherein said force vector reconstructing device comprises a memory device and a processor, and wherein said memory device stores the transfer function and said processor calculates information as to the behavior of markers from the image information of markers and calculates force vector distribution from the information as to the behavior of markers by using the transfer function.

9. The sensor of claim 8, wherein said force vector reconstructing device comprises a first processor and a second processor, and wherein said first processor calculates information as to the behavior of markers from the image information of markers and said second processor calculates force vector distribution from the information as to the behavior of markers by using the transfer function.

10. The sensor of claim 1, wherein said behavior of colored markers comprises at least one of displacement, strain and inclination of the markers.

11. The sensor of claim 1, wherein said information as to the behavior of markers is obtained as movement information of markers.

12. The sensor of claim 1, wherein said information as to the behavior of markers is obtained as variance of marker intensity.

13. The sensor of claim 1, wherein said marker groups have different spatial arrangements from each other.

14. The sensor of claim 1, wherein said force vector reconstructing device includes a transfer function by which a force vector applied to the arbitrarily curved surface or surfaces is reconstructed from information as to the behavior of markers, and said force vector distribution reconstructing device reconstructs forces applied to said arbitrarily curved surface from said information as to the behavior of markers by using the transfer function.

15. The sensor of claim 14, wherein said force vector reconstructing device comprises a memory device and a processor, and wherein said memory device stores the transfer function and said processor calculates information as to the behavior of markers from the image information of markers and calculates force vector distribution from the information as to the behavior of markers by using the transfer function.

16. The sensor of claim 15, wherein said force vector reconstructing device comprises a local processor and a central processor, and wherein said local processor calculates information as to the behavior of markers from the image information of markers and said central processor calculates force vector distribution from the information as to the behavior of markers by using the transfer function.

17. A method for reconstructing force vector distribution by using the optical tactile sensor of claim 1, the method comprising the steps of: obtaining one or more marker images by photographing the colored markers when the object contacts the arbitrarily curved surface of the elastic body; obtaining information as to the behavior of markers from the one or more marker images, and the number of information being greater than the number of force vectors to be obtained; and reconstructing the force vector distribution from the obtained information using the transfer function.

18. The method of claim 17, wherein said the transfer function is obtained by: discretely arranging a large number of sampling points on the arbitrarily curved surface of the elastic body; obtaining information as to the behavior of markers when a force having predetermined magnitude is applied to each sampling point in each direction of predetermined directions; and obtaining the transfer function from the force having predetermined known magnitude applied to each sampling point in said each predetermined direction and the obtained information as to the behavior of markers.

19. The method of claim 18, wherein said predetermined directions include x-direction, y-direction and z-direction.

20. A method of obtaining the transfer function for the optical tactile sensor of claim 1, the method comprising the steps of: discretely arranging a large number of sampling points on the arbitrarily curved surface of the transparent elastic body; obtaining information as to the behavior of markers when a force having predetermined magnitude is applied to each sampling point in each direction of predetermined directions; and obtaining the transfer function from the force having predetermined known magnitude applied to each sampling point in said each direction and the obtained information as to the behavior of markers.

21. The method of claim 20, wherein said predetermined directions include x-direction, y-direction and z-direction.

22. The sensor of claim 1, wherein the colored markers are arranged to follow the curvature of the arbitrarily curved surface.

23. A finger-shaped optical tactile sensor comprising:
one or more transparent elastic bodies, each body constituting an arbitrarily curved surface to be contacted by an object;
a plurality of marker groups provided in said each transparent elastic body, each marker group being comprised of a number of colored markers, with markers constituting different marker groups having different colors for each group;
one or more photographing devices for taking an image of behavior of colored markers when said arbitrarily curved surface or surfaces of said one or more transparent elastic bodies are contacted by the object to obtain image information of markers;
a force vector distribution reconstructing device for reconstructing forces applied to said arbitrarily curved surface from information as to the behavior of markers that is obtained from said image information of markers;
wherein the force vector distribution reconstructing device includes a transfer function by which a force vector applied to the arbitrarily curved surface is reconstructed from information as to the behavior of markers that is obtained from the image information of markers, and said force vector distribution reconstructing device reconstructing forces applied to said arbitrarily curved surface from said information as to the behavior of markers by using the transfer function wherein said transfer function is obtained by measurement or simulation; and
wherein said transfer function is obtained from information as to behavior of markers when forces having predetermined magnitude in predetermined directions are applied to sampling points arranged on the arbitrarily curved surface.

24. The sensor of claim 23, said sensor further comprising one or more nail-like bases, each of which is provided on the side opposite the arbitrarily curved surface of each of said one or more transparent elastic bodies, and wherein each of said one or more nail-like bases supports each of said one or more elastic bodies.

25. The sensor of claim 24, wherein each of said one or more photographing devices is mounted on each of said one or more nail-like bases and is opposed to said arbitrarily curved surface.

26. The sensor of claim 24, wherein each of said one or more photographing devices is mounted on an end portion of each of said one or more nail bodies and is opposed to said arbitrarily curved surface.

27. An optical tactile sensor comprising: a sensing part comprising a transparent elastic body and a plurality of marker groups provided in said body, each marker group being comprised of a number of colored markers, with markers constituting different marker groups having different colors for each group, said elastic body having an arbitrarily curved surface to be contacted by an object; a photographing device for taking an image of behavior of colored markers when said arbitrarily curved surface of said transparent elastic body is contacted by an object to obtain image information of the colored markers; a memory device storing a transfer function by which force vector applied to the arbitrarily curved surface is reconstructed from information as to the behavior of markers; and one or more processors, said one or more processors calculating the information as to the behavior of markers from said a image information of makers, and said one or more processors further calculating the force vector applied to said arbitrarily curved surface from said information as to the behavior of markers by using said transfer function wherein said transfer function is obtained by measurement or simulation;
wherein said transfer function is obtained from information as to behavior of markers when forces having predetermined magnitude in predetermined directions are applied to sampling points arranged on the arbitrarily curved surface.

* * * * *